United States Patent
Jo et al.

(10) Patent No.: US 11,505,250 B2
(45) Date of Patent: Nov. 22, 2022

(54) VEHICLE SUB-FRAME AND METHOD OF MANUFACTURING SAME

(71) Applicants: Hyundai Motor Company, Seoul (KR); Kia Motors Corporation, Seoul (KR); Dong Hee Industrial Co., Ltd., Ulsan (KR)

(72) Inventors: Gi Bong Jo, Seoul (KR); Hyun Min Jang, Suwon-si (KR); Sang Jae Shin, Seoul (KR); Chul Woo Kwak, Hwaseong-si (KR); Soo Cheol Lee, Ulsan (KR); Se Hoon Kim, Ulsan (KR)

(73) Assignees: Hyundai Motor Company, Seoul (KR); Kia Motors Corporation, Seoul (KR); Dong Hee Industrial Co., Ltd., Ulsan (KR)

( * ) Notice: Subject to any disclaimer, the term of this patent is extended or adjusted under 35 U.S.C. 154(b) by 243 days.

(21) Appl. No.: 17/032,512

(22) Filed: Sep. 25, 2020

(65) Prior Publication Data

US 2021/0354758 A1    Nov. 18, 2021

(30) Foreign Application Priority Data

May 14, 2020    (KR) ........................ 10-2020-0057424

(51) Int. Cl.
     *B62D 21/03*      (2006.01)

(52) U.S. Cl.
     CPC .................................. *B62D 21/03* (2013.01)

(58) Field of Classification Search
CPC combination set(s) only.
See application file for complete search history.

(56) References Cited

U.S. PATENT DOCUMENTS

2017/0137071 A1 *    5/2017    Kurokawa ............. B62D 21/11

FOREIGN PATENT DOCUMENTS

| EP | 3608209 A1 * | 2/2020 | ............. B60G 99/00 |
| JP | 2010115946 A * | 5/2010 | |
| JP | 2012148334 A * | 8/2012 | ........... B23K 20/122 |
| JP | 2018103714 A * | 7/2018 | ............. B62D 21/00 |
| WO | WO-2015189909 A1 * | 12/2015 | ............. B62D 21/00 |

* cited by examiner

*Primary Examiner* — Lori L Lyjak
(74) *Attorney, Agent, or Firm* — Morgan, Lewis & Bockius LLP

(57) ABSTRACT

Provided is a vehicle sub-frame including a front cross member, a rear cross member, and left and right side members mounted to connect the front cross member and the rear cross member to each other. Each of the left and right side members has a protrusion that protrudes laterally at a corner portion of a rear end portion thereof, the corner portion being joined to a corner portion of the rear cross member. A weld joint is formed by welding to the rear cross member along a laterally extending portion of a trim line portion of the protrusion, in which the trim line portion of the protrusion is the perimeter of the protrusion.

17 Claims, 7 Drawing Sheets

FIG. 4
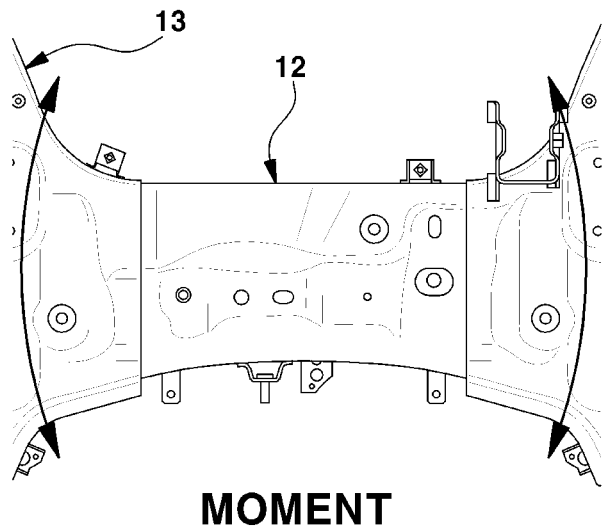
MOMENT
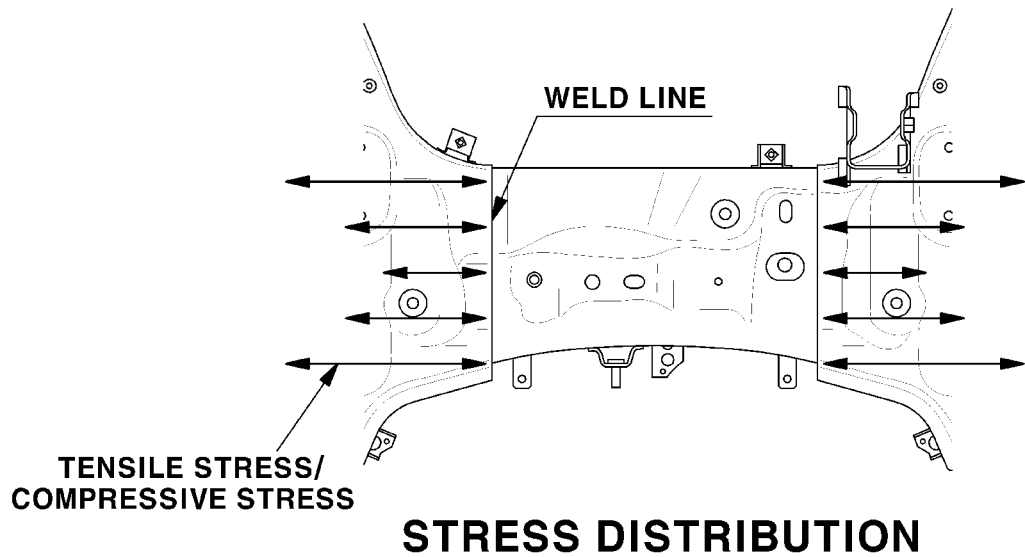
STRESS DISTRIBUTION (CROSS-SECTIONAL VIEW TAKEN ALONG LINE B-B)

"A'" VIEW

VEHICLE SUB-FRAME AND METHOD OF MANUFACTURING SAME

CROSS REFERENCE TO RELATED APPLICATION

The present application claims priority to Korean Patent Application No. 10-2020-0057424, filed May 14, 2020, the entire contents of which is incorporated herein for all purposes by this reference.

BACKGROUND OF THE INVENTION

Field of the Invention

The present invention relates to a vehicle sub-frame and a method of manufacturing the vehicle sub-frame. More particularly, the present invention relates to a vehicle sub-frame configured to greatly increase the strength of a weld joint between a cross member and a side member thereof and a method of manufacturing the vehicle sub-frame.

Description of Related Art

In most passenger cars, monocoque bodies rather than full-frame bodies are used due to the advantages of being lightweight and providing high productivity.

The monocoque body is a structural system with no load-carrying internal frames. In a monocoque-body vehicle, a power train including an engine, a transmission, a differential, and the like is mounted directly on a vehicle body.

Furthermore, suspension and chassis parts are mounted on the vehicle body that serves as a load-carrying support like a frame. A sub-frame is mounted in a lower portion of the vehicle body to prevent direct transfer of vibration of the power train to the monocoque body and to distribute shock from a vehicle collision.

A typical sub-frame includes a plurality of members. FIG. 1 is a plan view exemplarily illustrating a ladder type sub-frame 10 which is widely known.

As illustrated, the ladder type sub-frame 10 includes a front cross member 11, a rear cross member 12, and left and right side members 13. These members are combined through welding.

The suspension and steering parts, such as a lower arm 20 and a gearbox, are mounted on the vehicle sub-frame 10. The resulting assembly is then mounted on a vehicle body. Thus, the vehicle sub-frame 10 plays a very important role in supporting the suspension and steering portions and other vehicle portions on the vehicle body.

Therefore, the vehicle sub-frame needs to be manufactured in a manner to have strength to withstand a heavy load. In the present respect, when manufacturing the vehicle sub-frame, the strength of a weld joint between each of the members of the vehicle sub-frame is important because the strength of the vehicle sub-frame is determined according to the strength of the weld joints between the members.

In the vehicle sub-frame 10 according to the related art, the trim line portions of the respective side members 13 welded to the rear cross member 12 have a straight line form. Accordingly, when the rear cross member 12 and each of the side members 13 are welded to each other, a linear weld joint is formed.

However, in a structure in which the side members 13 are welded to the rear cross member 12 along a linear weld line, i.e., when a linear weld joint is formed, the weld joint is easy to crack or fracture.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle sub-frame and a method of manufacturing the vehicle sub-frame, which are configured for greatly increasing the strength of a weld joint between a cross member and a side member so that the weld joint is not easy to crack or fracture.

According to various aspects of the present invention, there is provided a vehicle sub-frame including: a front cross member; a rear cross member; and first and second side members disposed to connect the front cross member and the rear cross member to each other, in which each of the first and second side members has a protrusion protruding laterally at a corner portion of a rear end portion thereof, and in which a third weld joint that joins one of the first and second side members to the rear cross member is formed along a third portion of a trim line portion of the protrusion, in which the trim line portion of the protrusion is a perimeter of the protrusion and the third portion of the trim line portion is a lateral extending portion extending in leftward rightward directions.

According to various aspects of the present invention, there is provided a method of manufacturing a vehicle sub-frame, the method including: preparing a front cross member, a rear cross member, and left and right side members; welding a front end portion of each of the first and second side members to the front cross member; and welding a rear end portion of each of the left and right side member to the rear cross member, in which each of the first and second side members has a protrusion protruding laterally, at a corner portion of the rear end portion thereof, the corner portion being joined to a corner portion of the rear cross member. When the protrusion is welded to the rear cross member, a third weld joint is formed to extend along a third portion of a trim line portion of the protrusion, in which the trim line portion of the protrusion is a perimeter of the protrusion and the first portion of the trim line portion of the protrusion is a laterally extending portion extending in a leftward-rightward direction thereof.

The vehicle sub-frame and the method of manufacturing the vehicle sub-frame according to various exemplary embodiments of the present invention have an advantage in that the strength of the weld joint between the cross member and the side member is enhanced, preventing the weld joint from cracking or fracturing.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a view exemplarily illustrating a moment acting on the vehicle sub-frame according to the related art and distribution of tensile load and compression load caused by the moment;

Figure 1:
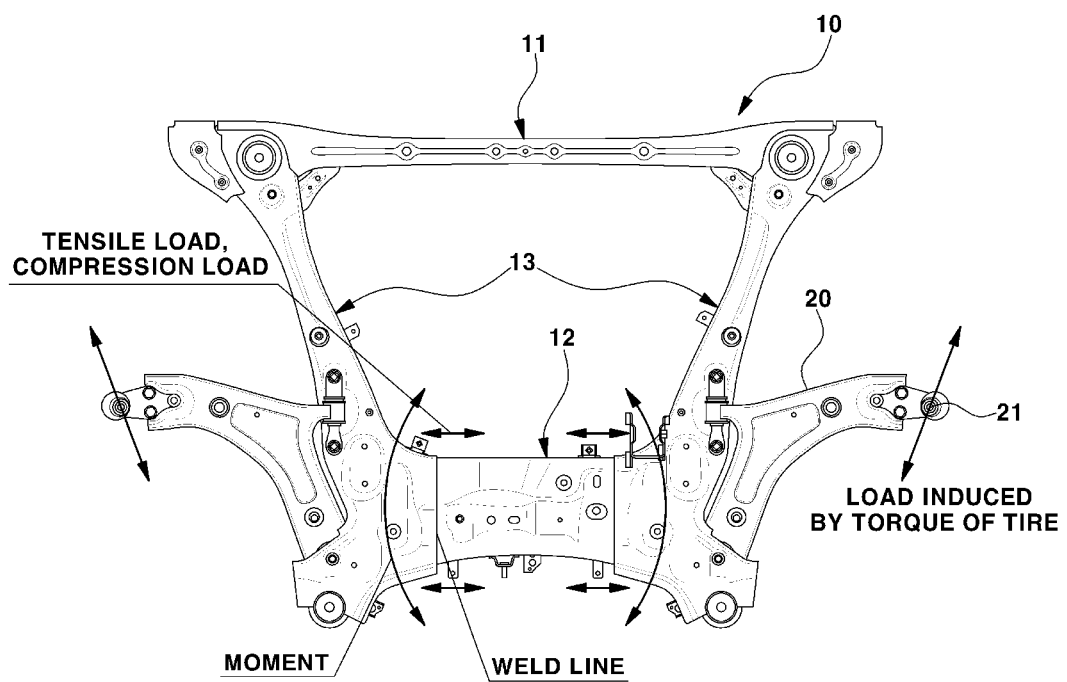
FIG. 1 is a plan view exemplarily illustrating a vehicle sub-frame according to the related art.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be in part determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Embodiments of the present invention will be described in detail below with reference to the accompanying drawings such that those skilled in the art to which various exemplary embodiments of the present invention pertains are able to implement the present invention without undue experimentation. However, the present invention is not limited to the exemplary embodiments that will be described below and may be embodied in other various forms.

It will be understood that the expression "one component includes, includes, or has a constituent element" used in the exemplary embodiment specifies the presence of the constituent element, but does not preclude the presence or addition of another constituent element, unless the context clearly indicates otherwise.

Problems with the related art will be described in more detail to help with a thorough understanding of the present invention.

Figure 2:
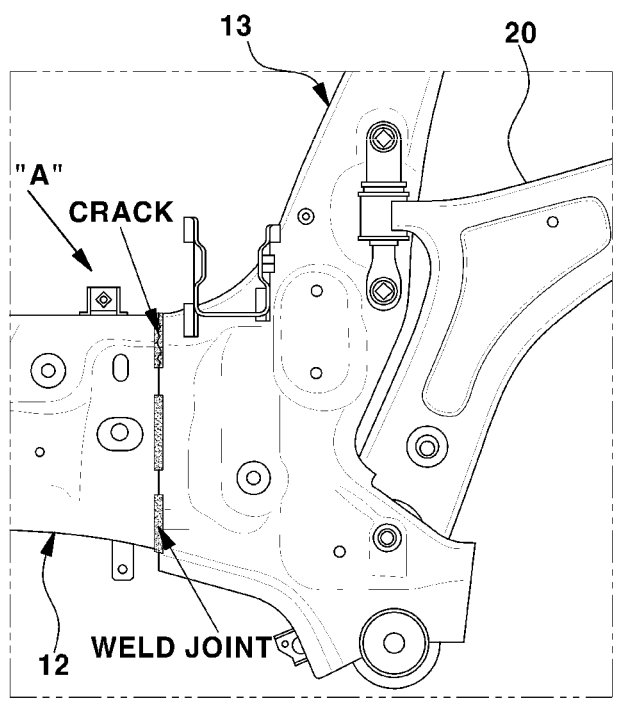
FIG. 2 and FIG. 3 are views each illustrating a damaged portion of a weld joint in the vehicle sub-frame according to the related art.
Figure 3:
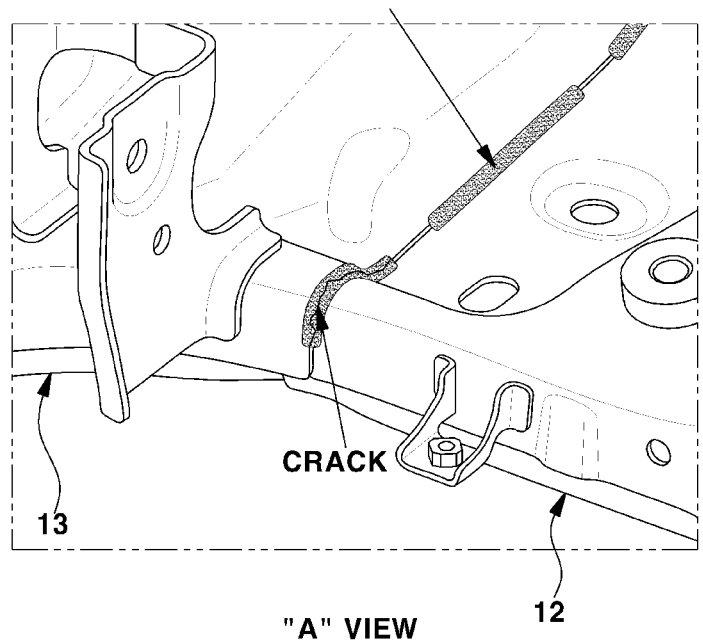

FIG. 2 and FIG. 3 are views each illustrating a weld joint in a sub-frame 10. FIG. 2 and FIG. 3 both illustrate the weld joint between a rear cross member 12 and a right side member 13.

FIG. 3 is a perspective view when viewed in "A" direction in FIG. 2. FIG. 3 is a perspective view illustrating a weld joint which may actually exist.

First, as illustrated in FIG. 2, when welding the rear cross member 12 and the right side member 13, intermittent welding is performed such that a plurality of discrete weld joints are formed at intervals along a weld line, rather than continuous welding that produces a single continuous weld joint.

The reason for this is that, in a case where welding is continuously performed to form a single continuous weld joint without break points along a weld line that extends across the rear cross member 12 in a widthwise direction thereof, welding quality is degraded due to strong thermal stress. Furthermore, since the rear cross member 12 has convex-curved portions at a front end portion and a rear end portion thereof, respectively, welding at the convex portions is difficult.

Furthermore, to prevent the degradation in the welding quality at a position where the welding is performed twice, the welding is performed inevitably in a manner to form discrete weld joints at intervals along a weld line, instead of forming a single continuous weld joint along the weld line.

However, the structure in which the rear cross member 12 and the right side member 13 are welded to each other along a straight weld line has a problem in that the weld joints easily break. FIG. 2 and FIG. 3 illustrates that a crack occurs within the weld joint of the vehicle sub-frame 10 in the related art.

Figure 5:
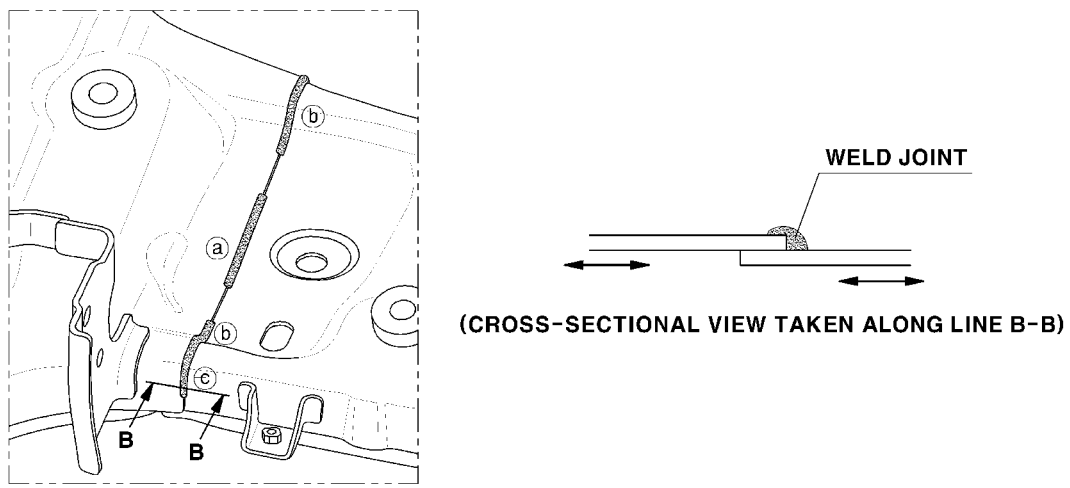
FIG. 5 includes a perspective view exemplarily illustrating tensile stress and compressive stress in the weld joint formed on the vehicle sub-frame according to the related art, and a cross-sectional view taken along line B-B.

FIG. 4 is a plan view exemplarily illustrating a moment occurring in the vehicle sub-frame 10 and the distribution of tensile load and compression load caused by the moment. FIG. 5 includes a perspective view exemplarily illustrating the vehicle sub-frame 10 and a cross-sectional view taken along line B-B. FIG. 5 illustrates that the weld joint between the rear cross member 12 and the right side member 13 suffer tensile stress and compressive stress.

The cause of damage such as a crack in the weld joint on the vehicle sub-frame 10 is a torque "a" of the tire, which is applied to a ball joint 21 of a lower arm 20, as illustrated in FIG. 1. The force transferred via the lower arm 20 results in a moment "b" that rotates the right side member 13 toward the rear cross member 12, as illustrated in FIGS. 1 and 4.

Furthermore, the present moment "b" causes the tensile stress and the compressive stress in the weld joint in a direction perpendicular to the weld line as illustrated in FIGS. 1 and 4. Iterations of the tensile stress and the compressive stress result in a crack or fracture in the weld joints disposed along the weld line.

That is, in the vehicle sub-frame 10 according to the related art, since the weld line between the rear cross member 12 and the right side member 13 is a straight line, and directions of the tensile stress and compressive stress are perpendicular to the weld line, the vehicle sub-frame 10 becomes structurally vulnerable.

Regarding the distribution of the moment-induced loads on the vehicle sub-frame 10, as illustrated in FIG. 4, a relatively light load is applied to the weld joint in the middle of the weld line, and a heavy load is applied to a weld joint which is positioned at an end portion of the weld line. As the distance from the middle of the weld line is increased, the load acting on the weld joint is correspondingly increased.

Due to such a load distribution on the vehicle sub-frame 10, a weld joint in a ⓐ area in FIG. 5 suffers a relatively moderate stress, and a weld joint in a ⓑ area suffers a relatively severe stress.

A ⓒ area where a lower end portion of the rearmost weld joint is present suffers the severest stress. The stress of the weld joint in the ⓒ area may exceed the yield stress, resulting in a crack or fracture occurring in the weld joint.

If the thickness of each of the front cross member 11, the rear cross member 12, and the right side member 13 is increased to improve the durability of the vehicle sub-frame 10, the manufacturing cost rises.

To prevent the damage to the weld joint, it is preferable to increase a welding length because the increase in the welding length reduces tensile load and compression load per unit length of a weld joint. Furthermore, to maximize the length of the weld joint, the welding needs to be performed to form a single continuous weld joint without any break point along a weld line. However, in the instant case, as described above, the welding quality is degraded due to severe thermal stress.

Furthermore, it is known that, when the weld line in the vehicle sub-frame 10 is a straight line as is the case with the related art, although the welding quality is improved, a phenomenon in the weld joint is damaged in a heavy-duty vehicle or a vehicle under heavy load still appears to be. Therefore, the improvement of the welding quality cannot be an ideal solution.

Before starting to describe various exemplary embodiments of the present invention, to more clearly distinguish the present invention from the related art, the vehicle sub-frame according to the related art will be more detailed with reference to FIG. 5.

As described above, in the vehicle sub-frame 10, a trim line portion of a portion of each of the left and right side members 13, which is welded to the rear cross member 12, is a straight line that runs in the backward-forward direction thereof. Accordingly, the rear cross member 12 and the right sight member 13 are welded to each other along a straight weld line.

FIG. 5 shows that the weld joints that joint the rear cross member 12 to the right side member 13 are all straight strips.

When welding the rear cross member 12 and the right side member 13, intermittent welding is performed such that a plurality of discrete weld joints are formed at intervals along the weld line from one end portion to the other end portion of the rear cross member 12, rather than continuous welding that forms a continuous single weld joint along the weld line from one end portion to the other end portion of the rear cross member 12.

The reason for this is that it is difficult to finish, at one time, welding for forming a single weld joint without any interruption along the weld line. The longer the length of the weld joint to be formed at one time, the greater the amount of heat to propagate to the vehicle sub-frame 10. Thus, hardening of the weld joint easily occurs due to the heat, and the welding strength deteriorates accordingly.

Therefore, as illustrated in FIG. 5, the welding is performed such that a plurality of discrete weld joints are disposed along the weld line. However, this provides the disadvantage that the sum of the lengths of the respective discrete weld joints is smaller than the length of the weld line.

The longer the length of the weld joint, the stronger the welding strength. Furthermore, the stronger the welding strength, the easier it is to prevent a defect likes a crack in the weld joint.

To prevent the damage, the welding may be performed such that the weld joints overlap. However, in the instant case, it is difficult to ensure the welding quality of the resulting overlapping weld joints.

Furthermore, in a straight-line weld structure in which the entire weld line between the rear cross member 12 and each of the left and right side members 13 linearly runs in the backward-forward direction without a curved portion, although the welding is performed such that a weld joint has a maximum length without any break points along the entire linear wed line, the maximum length of the weld joint for joining the rear cross member 12 and each of the left and right side members 13 is predetermined due to the structural constrain. Even in the instant case, in practice, it is also difficult to secure the maximum length of the weld joint with good welding quality.

Furthermore, the ⓒ area in FIG. 5 is an area where the rear cross member 12 and the left side member 13 are joined together, that is, an area where the panel portions that, respectively form the rear cross member 12 and the left side member 13 are joined together. In the ⓒ area, the panels of the rear cross member 12 and the left side member 13 are curved. Since the curved panels overlap in the ⓒ area, it is difficult to ensure good welding quality there.

To ensure the quality of the weld portion, a clearance between the curved portions of the rear cross member 12 and the left side member 13 (or the right side member) is very tightly set. However, it is not easy to manufacture the rear cross members 12 and the left side members 13 (or the right side members) in large quantities such that the clearance therebetween is tight. This is the reason for the difficulty of securing the welding quality of the curved parts.

Furthermore, although a method that can ensure good welding quality all the way along the weld joint is used, there still remains a problem in that the predetermined maximum length of a weld line cannot be increased due to the structural constraint.

Therefore, there is no other solution to the problem of the fracture or crack of a weld joint in a heavy-duty vehicle, except for a method of increasing the width (the dimension in the forward-backward direction) of the rear cross member 12. However, due to the vehicle layout constraint which means that the engine needs to be accommodated in the front side of the vehicle and the muffler and other accessories need to be accommodated in the rear side of the vehicle, it is not easy to increase the width (dimension in the backward-forward direction) of the rear cross member 12.

Furthermore, there is also a problem in that it is difficult to improve the welding qualities of the curved portions of the panel portions of the rear cross member 12 and the left side member 13 (or the right side member). Considering the present problem, it is the best way to remove the convex-curved portions like the ⓑ area in FIG. 5.

However, in terms of steering performance, the curved portions like the ⓑ area cannot be removed because they are required for application of rack-type motor driven power steering (R-MDPS) that provides excellent steering performance. Therefore, it is difficult to avoid welding on the curved portions.

To solve the problems described above, various aspects of the present invention are directed to providing a vehicle sub-frame with a side member having an improved trim line portion at which welding to a rear cross member is performed.

A vehicle sub-frame according to various exemplary embodiments of the present invention will be described in detail below with reference to the drawings.

Figure 6:
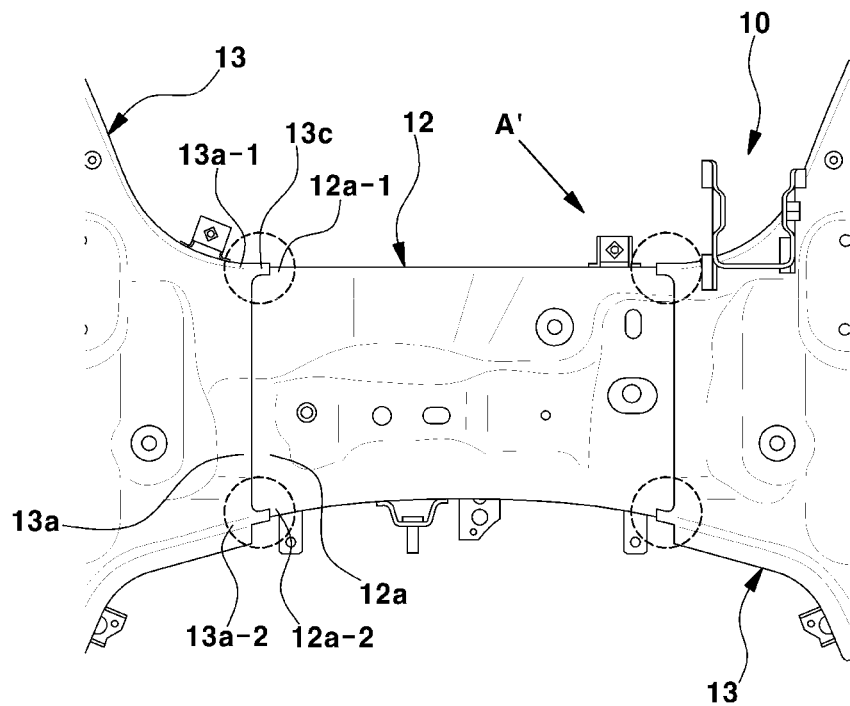
FIG. 6 is a view exemplarily illustrating an improved portion of a vehicle sub-frame according to various exemplary embodiments of the present invention.
Figure 7:
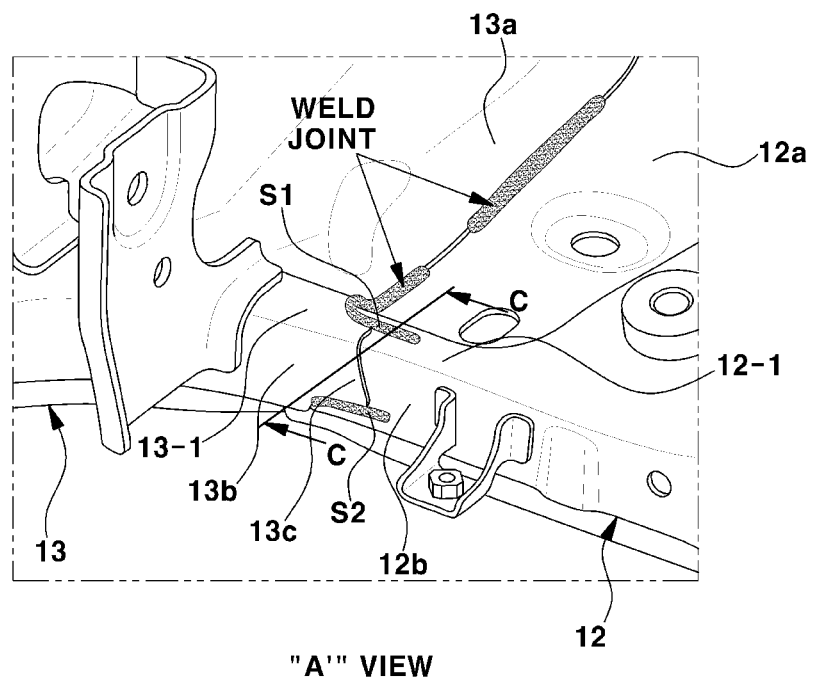
FIG. 7 is a view exemplarily illustrating an improved trim line portion of a side member and an improved weld line of the vehicle sub-frame according to various exemplary embodiments of the present invention.
Figure 8:
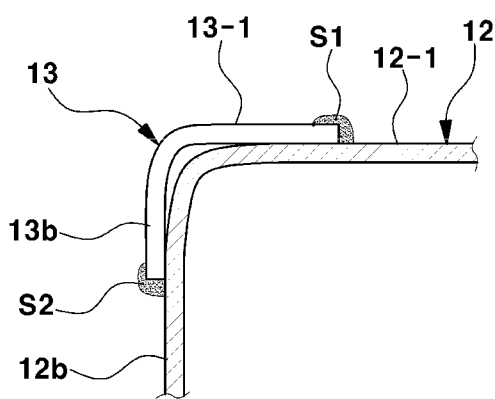
FIG. 8 is a cross-sectional view taken along line C-C in FIG. 7.

FIG. 6 is a view exemplarily illustrating an improved portion of the vehicle sub-frame 10 according to various exemplary embodiments of the present invention. FIG. 7 is a view exemplarily illustrating the improved shape of the trim line portion and the weld line for each of the left and right side members 13 in the vehicle sub-frame 10 according to various exemplary embodiments of the present invention. FIG. 8 is a cross-sectional view taken along line C-C' in FIG. 7.

Figure 9:
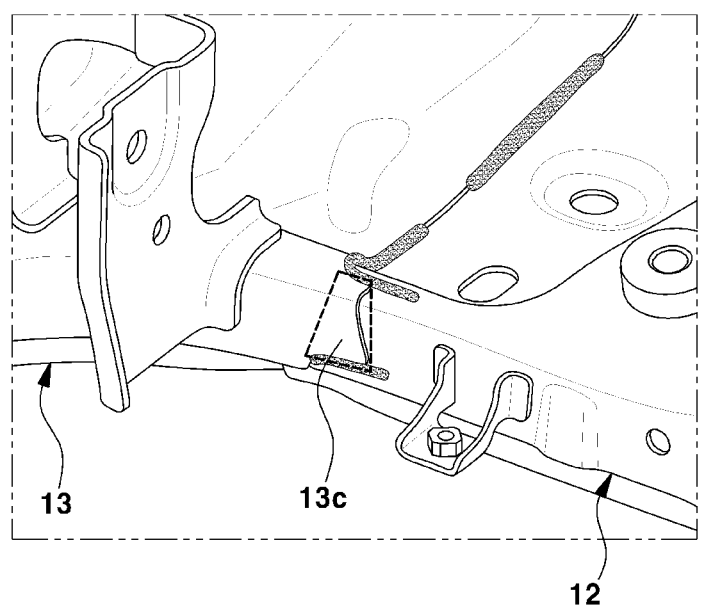
FIG. 9 is a view exemplarily illustrating the shape of a corner portion of a side member of the vehicle sub-frame according to various exemplary embodiments of the present invention.

Furthermore, FIG. 9 is a view exemplarily illustrating a shape of a corner portion of a left side member in the vehicle sub-frame 10 according to various exemplary embodiments of the present invention. FIG. 9 illustrates an example in which a protrusion 13c has an overall trapezoidal shape.

The vehicle sub-frame 10 according to various exemplary embodiments of the present invention includes a front cross member 11, a rear cross member 12, a left side member 13, and a right side member 13.

When manufacturing the vehicle sub-frame 10 according to various exemplary embodiments of the present invention, a process of welding the front end portion of the left side member and the front end portion of the right side member to the front cross member 11 is not different from known techniques.

However, a process of welding the left side member and the right side member to the rear cross member 12 is greatly different from known techniques because the trim line portions of the left side member and the right side member of the vehicle sub-frame 10 according to various exemplary embodiments of the present invention are different from those in related arts.

In the following description of the exemplary embodiments of the present invention, the backward-forward direction and the leftward-rightward direction are defined with respect of the direction of a vehicle body. The backward-forward direction and the leftward-rightward direction of the vehicle sub-frame are coincident with the backward-forward direction and the leftward-rightward direction of the vehicle body, respectively.

The construction of the vehicle sub-frame according to the exemplary embodiment of the present invention is described with reference to FIG. 1.

As illustrated in FIG. 1, among the members that form the vehicle sub-frame 10, the front cross member 11 is disposed in the front of the vehicle sub-frame 10, to extend in a transverse direction of the vehicle body.

Furthermore, the rear cross member 12 is disposed in the rear of the vehicle sub-frame 10, to extend in the transverse direction of the vehicle body.

In addition the left and right side members 13 are disposed in the left side and the right side, respectively. The left and right side members 13 are disposed to extend in a longitudinal direction of the vehicle body to connect the front cross member 11 and the rear cross member 12 to each other.

In the instant case, a front end portion of the left side member 13 is combined with a left end portion of the front cross member 11, and a rear end portion of the left side member is combined with a left end portion of the rear cross member 12. Likewise, a front end portion of the right side member is combined with a right end portion of the front cross member 11, and a rear end portion of the right side member 13 is combined with a right end portion of the rear cross member 12.

When the two side members 13 are combined with the rear cross member 12, a welding process is used. In the instant case, the rear end portion of the left side member 13 is welded to the left end portion of the rear cross member 12, and the rear end portion of the right side member 13 is welded to the right end portion of the rear cross member 12.

The left and right side members 13 and the rear cross member 12 are made from weldable panels through well-known press working.

The front cross member 11, the rear cross member 12, and the left and right side members 13 that form the vehicle sub-frame 10 are made from a metal panel (that is, a plate material). Therefore, welding the left and right side members 13 to the front and rear cross members 11 and 12 to manufacture the vehicle sub-frame 10 according to various exemplary embodiments of the present invention means welding them in a state where the panels of them overlap.

The rear end panel portion of the left side member 13 is welded to the left end panel portion of the rear cross member 12 in an overlapping manner and the rear end panel portion of the right side member 13 is welded to the right end panel portion of the rear cross member 12 in an overlapping state.

In a state in which the rear end portion of the left side member 13 and the left end portion of the rear cross member 12 are overlapped, and the rear end portion of the right side member 13 and the right end portion of the rear cross member 12 are overlapped, the periphery (i.e., trim line part) of the left side member 13 and the periphery (i.e., trim line part) of the right side member 13 are welded to the surface of the rear cross member 12.

When welding each side member 13 to the rear cross member 12, the welding is performed along the trim line portion of each side member 13 in a state where the trim line portion of the side member 13 is placed on the surface of the rear cross member 12. Therefore, the trim line portion of each side member 13 is referred to as a weld line.

That is, the trim line portion of each side member is a portion for welding, and the shape of the trim line portion corresponds to the shape of the weld line. Of the entire trim line portion of each of the side members 13, except for some portions positioned on four corner portions (front left, rear left, front right, and rear right corner portions) of the rear cross member 12, the remaining portion is linear. That is, the remaining trim line portion positioned on the upper surface 12a of the rear cross member 12 is linear.

In the instant case, the linear portion of the trim line portion of each of the side members 13 extends in a widthwise direction of the rear cross member 12. The widthwise direction of the rear cross member 12 corresponds to the backward-forward direction of the vehicle body. The linear portion of the trim line portion of each side member 13 is disposed on the upper surface 12a of the rear cross member 12.

Furthermore, at each longitudinal end of the rear cross member 12, the front end portion and the rear end portion of the upper surface 12a of the rear member 12 are provided with front and rear formation portions 12a-1 and 12a-2 that are convex-curved portions, respectively. Herein, a portion including the front formation portion 12a-1 of the upper surface 12a and a portion of the front surface 12b of the rear cross member 12 will be referred to as a front corner portion. Likewise, a portion including the rear formation portion 12a-2 of the upper surface 12a and a portion of the rear surface of the rear cross member 12 will be referred to as a rear corner portion. Each corner portion of the rear cross member 12 is a bent portion having a curved surface with a predetermined curvature (refer to FIGS. 7 and 8).

The rear end portion of each of the left and right side members 13 has an upper surface 13a, a front surface 13b, and a rear surface that are disposed to respectively overlap the upper surface 12a, the front surface 12b, and the rear surface of the rear cross member 12. Furthermore, a front end portion and a rear end portion of the upper surface 13a are provided with formation portions 13a-1 and 13a-2 which are convex-curved portions, respectively.

Furthermore, the front formation portion 13a-1 and the rear formation portion 13a-2 of the left side member 13 (or the right side member 13) are formed to have shapes that correspond to the shapes of the front formation portion 12a-1 and the rear formation portion 12a-2 of the rear cross member 12, respectively. Each longitudinal end portion (i.e., left end portion and right end) of the rear cross member 12 is provided with the front formation portion 12a-1 and the rear formation portion 12a-2.

In the instant case, a portion that includes the front formation portion 13a-1 and at least a portion of the front surface 13b is called a front corner portion of the left side member 13 (or the right side member 13). Likewise, a portion that includes the rear formation portion 13a-2 and at least a portion of the rear surface is also called a rear corner portion of the left side member 13 (or the right side member 13). Each of the front and rear corner portions of the left side member 13 (or the right side member 13) is a bent portion with a curved surface with a predetermined curvature (refer to FIGS. 7 and 8).

On the other hand, according to various exemplary embodiments of the present invention, the trim line portion of the rear end portion of the left side member 13 is welded to the left end portion of the rear cross member 12, and the trim line portion of the rear end portion of the right side member 13 is welded to the right end portion of the rear cross member 12. At each welded portion, the end portion of the left side member 13 (or the right side member 13) surrounds the end portion of the rear cross member 12.

When joining the left side member 13 (or the right side member 13) to the rear cross member 12, intermittent welding is performed. That is, a plurality of discrete weld joints are formed on a weld line rather than a single continuous weld joint formed all the way along the entire weld line.

In the instant case, the corner portion of the rear end portion of the left side member 13 (or the right side member 13) is welded to the corner portion of the rear cross member 12 in an overlapping manner. At the instant time, the welding on the corner portion of the rear cross member 12 is performed along the trim line portion of the rear end portion of the left side member 13 (or the light side member 13).

That is, the corner portion of the rear end portion of the left side member 13 (or the right side member 13) is placed on the corner portion of the left end portion (or the right end portion) of the rear cross member 12 in an overlapping manner, and in the instant state, the corner portions are welded.

Referring to FIG. 7, only a predetermined portion of the trim line portion of the rear end portion of the left side member 13 (or the right side member 13) is welded to the surface of the rear cross member 12.

Furthermore, in the vehicle sub-frame 10 according to various exemplary embodiments of the present invention, as illustrated in FIGS. 6 to 8, the shapes of the trim line portions of the front corner portion and the rear corner portion of the rear end portion of the left side member 13 are improved. The same also applies to the right side member 13.

Referring to FIG. 6 and FIG. 7, the shapes of the trim line portions of both the front corner portion and the rear corner portion of the rear end portion of the left side member 13 are improved. The same applies to the right side member 13. Of the entire trim line portion of the rear end portion of each of the left and right side members 13, a first portion welded to the upper surface 12a of the rear cross member 12 runs straight. However, of the entire trim line portion of the rear end portion, a second portion that corresponds to the perimeter of each corner portion of the left side member 13 (or the right side members 13) includes a moderately curved portion and a linear portion.

Referring to FIGS. 7 and 9, it may be seen that the shapes of the trim line portion and weld line for the weld joint in each of the left and right side members 13 are improved. As illustrated, each corner portion of the left and right side members 13 has a portion 13c (hereinafter referred to as "protrusion") that protrudes laterally.

Accordingly, in each corner portion of the left and right side members 13, due to the protrusion 13c, unlike the straight trim line portion (or weld line) which is welded to the upper surface 12a of the rear cross member 12, the trim line portion (or weld line) have a moderately curved portion and a linear portion.

FIG. 7 is a perspective view exemplarily illustrating a combined structure of the left side member and the rear cross member when viewed from the direction indicated by arrow A'. FIG. 7 illustrates that the front corner portion of the rear end portion of the right side member 13 protrudes rightward (leftward in FIG. 6). That is, the front corner portion of the rear end portion of each side member protrudes toward the rear cross member.

In the instant case, as illustrated in FIG. 7, in the corner portion of each of the left and right side members 13, the trim line portion provided as the weld line is a moderately curved line. The trim line portion runs rightward (leftward in FIG. 6) while drawing a moderate diagonal curve on the upper surface of the rear cross member 12, then curves at the front end portion (or rear end) of the upper surface of the rear cross member 12 to run downward, and then runs linearly downward along the front surface (or rear surface) of the rear cross member 12, and finally curves to run leftward (rightward in FIG. 6).

In the present manner, in the rear end portion of each of the left side and right side member 13, the protrusion 13c that protrudes laterally is placed on the corner portion of the rear cross member 12, and the welding is performed on the trim line portion of the protrusion 13c of the side member 13.

In the instant case, it is not necessary to perform welding along the entire trim line portion of the protrusion 13c. As illustrated in FIG. 7, of the entire trim line portion of the protrusion 13c, the welding may be performed only along a laterally extending portion (hereinafter, referred to as third portions) that extends rightward (leftward in FIG. 6).

With reference to FIG. 8, there may be a case where a curvature or the degree of bending (also called bending angle) may differ between the corner portion of the left side member (or the right side members 13) and the corner portion of the rear cross member 12. In the instant case, as illustrated in FIG. 7, of the entire trim line portion of the protrusion 13c of the side member 13, the third portion that extends rightward (leftward in FIG. 6) may be welded to the rear cross member 12.

The trim line portion of the protrusion 13c of each of the left and right side members 13 includes two laterally extending portions, as illustrated in FIG. 7. That is, an upper lateral linear portion (also called upper weld section) S1 and a lower lateral linear portion (also called lower weld section) S2 of the trim line portion of the protrusion 13c are welded. In the case where the curvature or the degree of bending differs between the corner portion of the rear cross member 12 and the corner portion of the side member 13, a quite large clearance may be present between the most area of the corner portion of the rear cross member 12 and the most area of the corner portion of the side member 13. In the instant case, only at the upper lateral linear portion S1 and the lower lateral linear portion S2, the corner portion of the rear cross member 12 and the corner portion of the side member 13 are in tight contact with each other.

Therefore, only the two portions (i.e., upper and lower lateral linear portions) of the trim line portion of the protrusion 13c of the side member 13 are welded to the rear cross member 12. Herein, the upper and lower lateral linear portions S1 and S2 will be referred to as upper and lower weld sections, respectively. Accordingly, a weld joint is not formed in an intermediate section between the upper weld section S1 and the lower weld section S2 of the trim line portion of the protrusion 13c of the side member 13.

Referring to FIG. 7, a weld joint on the upper weld section S1 of the trim line portion of the protrusion 13c of each of the left and right side members 13 may continuously run up to a portion of the trim line portion (referred to as first portion) which is placed on the upper surface 12a of the rear cross member 12.

As described above, according to various exemplary embodiments of the present invention, the weld line profile of each of the side members 13 is improved such that the corner portion of each side member 13 is provided with the protrusion 13c that protrudes toward the rear cross member. Furthermore, of the entire trim line portion of the protrusion 13c, only the upper weld section S1 and the lower weld section S2 which are laterally extending portions (called third portions) are welded to the rear cross member 12.

Referring to FIG. 7, in a state in which the upper weld section S1 and the lower weld section S2 of the trim line portion of the protrusion 13c of each of the left and right side members 13 is in tight contact with the surface of the corner portion of the rear cross member 12, the welding is performed.

Furthermore, the upper weld section S1 and the lower weld section S2 of the trim line portion of the protrusion 13c of each of the left and right side members 13 do not run across a border portion (bent portion) between the upper surface 12a and the front surface 12b (or the rear surface) of the rear cross member 12. That is, welding is performed only within the upper surface 12a and the front surface 12b (or the rear surface) of the rear cross member such that weld joints at the upper weld section S1 and the lower weld section S2 are linear or are very moderately curved. Therefore, the welding is easy to perform and good welding quality may be secured because welding of curved sections is not necessary.

Furthermore, as illustrated in FIG. 8, the side member and the rear cross member have different curvatures at the respective corner portions at which welding is difficult to perform and welding quality is difficult to secure. However, at the upper weld section S1 and the lower weld section S2 at which the welding is easy to perform, the welding is performed in a state where the rear cross member 12 and the side members 13 are in tight contact with each other. This enables mass production with good welding quality when the vehicle sub-frames are manufactured.

Furthermore, with the linearly extending weld joints formed in the upper weld section S1 and the lower weld section of the trim line portion of the protrusion 13c of each of the left and right side members 13, a sufficient welding length may be obtained. Therefore, it is possible to ensure sufficient welding strength and durability of the vehicle sub-frame.

As illustrated in FIG. 4 and FIG. 5, the tensile load and compression load acts, in the leftward-rightward direction thereof, on the rear cross member 12 and the side members 13. As illustrated in FIG. 2, a linear weld joint is formed to extend in the backward-forward direction which is perpendicular to the leftward-rightward direction thereof. Therefore, the weld joint easily cracks and fractures.

However, according to various exemplary embodiments of the present invention, in the protrusion 13c of each of the left side and right side member 13, the weld joints extend a sufficiently long distance in the leftward-rightward direction that are in parallel to the tensile load and compression load. That is, the protrusion 13c provides an advantage of increasing the length of the weld joint extending in the direction of the tensile load and the compression load.

As the length of the weld joint is increased, an input load per unit length of the weld joint is decreased. Therefore, the durability of the weld joint is enhanced.

Furthermore, according to various exemplary embodiments of the present invention, the weld joint formed along the trim line portion of the protrusion 13c extends a sufficiently long distance in the leftward-rightward direction that are the same as the directions of the tensile load and the compression load, and the remaining weld joint formed on the upper surface of the rear cross member 15 extends a long distance in the direction approximately perpendicular to the tensile load and the compression load.

That is, since both of the weld joint that extends in the direction of the tensile load and the compression load and the weld joint that extends in the perpendicular direction to the tensile load and the compression load are formed, the vehicle sub-frame has a sturdy structure that can withstand a heavy load.

Furthermore, from the perspective of the stress distribution, that is, the distribution of the stress caused by a moment as illustrated in FIG. 4, the stress is gradually increased toward a widthwise end of the rear cross member 12 from a widthwise middle portion of the rear cross member 12.

Therefore, it is necessary to increase the welding strength and the welding length at the widthwise ends of the rear cross member because the stress is concentrated thereon. To deal with the present issue, according to various exemplary embodiments of the present invention, each of the side members is configured in a manner to have protrusions 13c at respective corners of a rear end thereof. Due to the presence of the protrusions 13c, the shapes of the trim line portion and the weld line are improved, resulting in increases in the welding strength and the welding length.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle sub-frame comprising:
   a front cross member;
   a rear cross member; and
   first and second side members provided to connect the front cross member and the rear cross member to each other,
   wherein each of the first and second side members has a protrusion that is formed to protrude laterally and which is provided on a corner portion of a rear end portion of the first and second side members, the corner portion being joined to a corner portion of the rear cross member, and
   wherein a third weld joint is formed by welding to the rear cross member along a third portion of a trim line portion of the protrusion, the third portion being a laterally extending portion.

2. The vehicle sub-frame according to claim 1, wherein the trim line portion is a perimeter of the protrusion.

3. The vehicle sub-frame according to claim 1,
   wherein, of an entire trim line portion of the rear end portion of each of the left and right side members, a first portion thereof is placed on an upper surface of the rear cross member and is formed to linearly extend in a widthwise direction of the rear cross member, and
   wherein a first weld joint is formed by welding to the upper surface of the rear cross member, along the first portion of the trim line portion of the rear end portion of each of the left and right side members.

4. The vehicle sub-frame according to claim 3,
   wherein the first portion of the trim line portion of the rear end portion of each of the first and second side members is a linear line extending in the widthwise direction of the rear cross member, and
   wherein the first weld joint is a linear weld joint formed along a second portion of the trim line portion.

5. The vehicle sub-frame according to claim 3, wherein the third weld joint formed along the third portion of the trim line portion of the protrusion is formed to extend in a leftward-rightward direction of the vehicle sub-frame, and
   wherein the first weld joint formed along the widthwise direction of the rear cross member on the upper surface of the rear cross member, is formed to extend in a backward-forward direction of the vehicle sub-frame.

6. The vehicle sub-frame according to claim 1,
   wherein the rear end portion of each of the first and second side members has a front corner portion and a rear corner portion that are respectively joined to a front corner portion and a rear corner portion of a longitudinal end of the rear cross member,
   wherein each of the front corner portion and the rear corner portion of each of the first and second side members has the protrusion that is formed to protrude laterally, and
   wherein the third weld joint is formed along the third portion of the trim line portion of the protrusion of each of the front corner portion and the rear corner portion.

7. The vehicle sub-frame according to claim 6, wherein the third portion of the trim line portion of the protrusion of the front corner portion of each of the first and second side members includes:
   an upper weld section positioned on an upper surface of the rear cross member; and
   a lower weld section positioned on a front surface of the rear cross member.

8. The vehicle sub-frame according to claim 6, wherein the third portion of the trim line portion of the protrusion of the rear corner portion of each of the first and second side members includes:
   an upper weld section positioned on the upper surface of the rear cross member; and
   a lower weld section positioned on a rear surface of the rear cross member.

9. The vehicle sub-frame according to claim 1,
   wherein at each longitudinal end portion of the rear cross member, a front end portion and a rear end portion of an upper surface of the rear cross member have front and rear formation portions that are convex-curved portions, respectively, and
   wherein third weld joints are formed by welding in a state in which each protrusion of the first and second side members is in contact with a front corner portion and a rear corner portion of the rear cross member, the front corner portion including a front formation portion and a portion of a front surface of the rear cross member, the rear corner portion including a rear formation portion and a portion of a rear surface of the rear cross member.

10. A method of manufacturing a vehicle sub-frame, the method comprising:
    preparing a front cross member, a rear cross member, and first and second side members;
    welding a front end portion of each of the first and second side members to the front cross member; and
    welding a rear end portion of each of the first and second side members to the rear cross member,
    wherein each of the first and second side members has a protrusion that is formed to protrude laterally and which is positioned on a corner portion of the rear end portion of each of the first and second side members, the corner portion being joined to a corner portion of the rear cross member, and
    wherein when welding the rear end portion of each of the first and second side members to the rear cross member, the welding is performed along a third portion which is a laterally extending portion of a trim line portion of the protrusion, the trim line portion being a perimeter of the protrusion.

11. The method according to claim 10,
    wherein a first portion of a trim line portion of the rear end-portion of each of the first and second side members is formed to linearly extend in a widthwise direction of the rear cross member and is welded to an upper surface of the rear cross member, and
    wherein the welding is performed on the upper surface of the rear cross member along the first portion of the trim line portion of the rear end portion of each of the first and second side members.

12. The method according to claim 11,
    wherein the first portion of the trim line portion of the rear end portion of each of the first and second side members is a straight line that runs in the widthwise direction of the rear cross member, and wherein a first weld joint is formed to linearly extend along the first portion of the trim line portion of the rear end portion of each of the left side and right side members, so that the first weld joint is formed to linearly extend in the widthwise direction of the rear cross member.

13. The method according to claim 11,
wherein a third weld joint formed along the laterally extending portion of the trim line portion of the protrusion is formed to extend in a leftward-rightward direction of the vehicle sub-frame, and
wherein the first weld joint formed along the widthwise direction of the rear cross member on the upper surface of the rear cross member, is formed to extend in a backward-forward direction of the vehicle sub-frame.

14. The method according to claim 10,
wherein each of the first and second side members has the protrusion that is formed to protrude laterally at the corner portions of the rear end portion thereof, the corner portions being respectively joined to a front corner portion and a rear corner portion of a longitudinal end portion of the rear cross member, and
wherein third weld joints are formed along the laterally extending portions of the trim line portion of each of the protrusions of the first and second side members.

15. The method according to claim 14, wherein, in the corner portion of the first or second side member, which is welded to the front corner portion of the rear cross member, the laterally extending portion of the trim line portion of the protrusion includes:
an upper weld section which is welded to an upper surface of the rear cross member; and
a lower weld section which is welded to a front surface of the rear cross member.

16. The method according to claim 14, wherein, in a corner portion of the first or second side member, which is welded to the rear corner portion of the rear cross member, the laterally extending portion of the trim line portion of the protrusion includes:
an upper weld section welded to an upper surface of the rear cross member, and
a lower weld section welded to a rear surface of the rear cross member.

17. The method according to claim 10,
wherein in each longitudinal end portion of the rear cross member, a front end portion and a lower end portion of an upper surface of the rear cross member are respectively provided with a front formation portion and a rear formation portion that are convex-curved portions, and
wherein in the welding of the rear end portion of each of the first and second side members to the rear cross member, each protrusion of the first and second side members is respectively brought into contact with a front corner portion including the front formation portion and a portion of a front surface of the rear cross member and a rear corner portion including the rear formation portion and a portion of a rear surface of the rear cross member, and then the welding is performed to form third weld joints.

* * * * *